3,788,936
NONWOVEN LAMINATE CONTAINING BONDED CONTINUOUS FILAMENT WEB

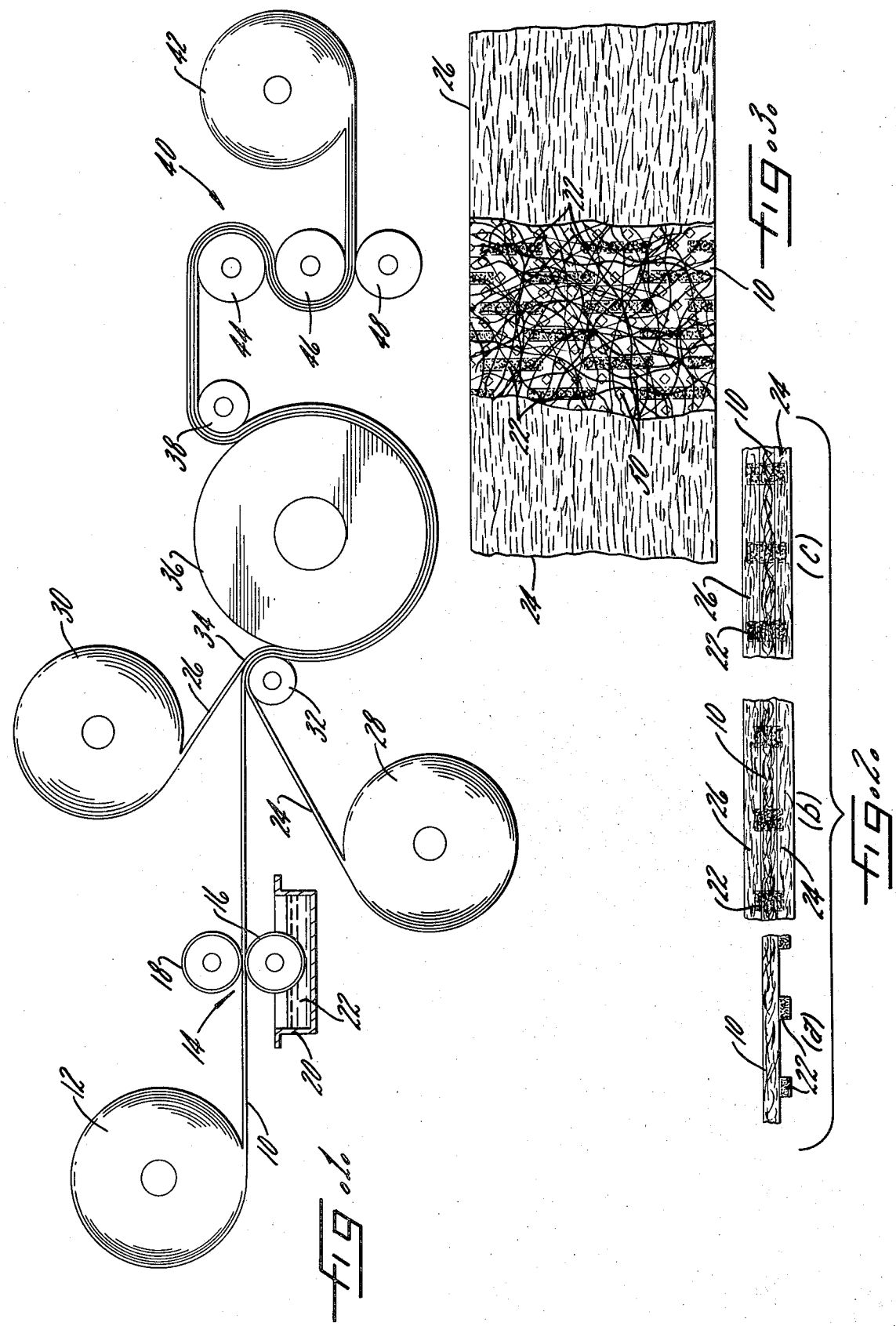

Robert James Brock, Appleton, and Paul Bernard Hansen and John C. Wilson, Neenah, Wis., assignors to Kimberly-Clark Corporation, Neenah, Wis.
Continuation-in-part of abandoned application Ser. No. 14,943, Feb. 27, 1970. This application Sept. 1, 1971, Ser. No. 177,078

Int. Cl. B32b 7/14
U.S. Cl. 161—148
17 Claims

ABSTRACT OF THE DISCLOSURE

Laminates comprising a cellulosic web and a web of continuous thermoplastic filaments are disclosed. The continuous filament web is bonded by means of an intermittent pattern of spot bonds which are characterized by their ability to release bonded filaments at levels of strain approaching but less than the breaking strength of the filaments. The disclosed laminates are strong, attractive in appearance, can absorb and retain fluid, and possess desirable energy absorption characteristics, especially over small laminate elongations.

RELATED APPLICATIONS

The present application is a continuation-in-part of our copending patent application, Ser. No. 14,943 filed Feb. 27, 1970 for: Nonwoven Laminate Containing Bonding Continuous Filament Web, which application is now abandoned.

BACKGROUND OF THE INVENTION

This invention relates to nonwoven fabrics and, more particularly, to lightweight nonwoven laminates including webs of continuous thermoplastic filaments.

Nonwoven webs comprised of a plurality of substantially continuous and randomly deposited, molecularly oriented filaments of a thermoplastic polymer are widely known. Among others, the following patents illustrate a variety of methods for preparing such webs: Kinney (U.S. Pats. 3,338,992 and 3,341,394); Levy (U.S. Pat. 3,276,944); Peterson (U.S. Pat. 3,502,538); Hartmann (U.S. Pats. 3,502,763 and 3,509,009); Dobo et al. (U.S. Pat. 3,542,615); and Harmon (Canadian Pat. 803,714).

While many different methods are illustrated for initially preparing such continuous filament webs, the available methods generally have at least three common features. First, the methods of preparation involve continuously extruding a thermoplastic polymer (either from the melt or a solution) through a spinneret in order to form discrete filaments.

Thereafter, the filaments are drawn (either mechanically or pneumatically) in order to molecularly orient the polymer filaments and achieve tenacity. Lastly, the filaments are deposited in a substantially random manner onto a carrier belt or the like to form a web with substantially isotropic physical characteristics.

These webs, hereinafter referred to as continuous filament webs, have been used in a wide variety of product applications. For example, they have been employed as curtain drape material, bookbinding material, insulation, and backings for carpet. However, while the webs are generally suitable for uses such as have been described, there has been only limited use of these materials in the field of disposable fabric products, such as clothing, bed sheets, pillow cases, and the like. While products in these areas have employed nonwoven webs, the nonwovens have been generally prepared from staple length fibers that are either resin bonded or bonded to tissue. Also, scrim-reinforced materials, i.e., crossed sets of threads bonded at their points of intersection and employed as a reinforcing layer for one or more plies of tissue, have been used as disposable nonwovens. The optimum suitability of these nonwovens for disposable fabric uses is generally restricted with respect to either their appearance, their strength characteristics, or their ability to absorb energy under strain.

The use of continuous filament nonwoven webs for disposable fabrics has been limited because of the need for a desirable "hand" in combination with a pleasing appearance and adequate strength characteristics. In this respect, it has been found that continuous filament webs possessing a desirable hand such that they would be suitable for uses such as bed sheets, hospital gowns and the like, frequently do not possess the necessary uniform and functional opaque appearance required in such applications. On the other hand, while the opaqueness can be increased by using webs with higher basis weights, the webs do not have the required desirable hand, particularly if subsequent softening techniques such as embossing are not employed and if overall web bonding techniques are used. Other methods of improving the opacity of low basis weight webs, such as by using lower denier filaments, have processing drawbacks since, for practical purposes, it is difficult to extrude such low denier continuous filaments.

Moreover, even if a continuous filament web was prepared with an acceptable combination of hand, opacity, and strength, such a web would still be lacking in one very important characteristic. Because such webs are comprised predominantly of hydrophobic thermoplastic polymers having an inherently low capacity for absorbing and retaining fluids such as water, the webs themselves also have such low capacity and retentiveness. This behavior is particularly troublesome where it is desirable to treat the web with an agent such as a flame retardant, a necessity for many types of disposable products. Customarily, flame retardants are inexpensively applied with an aqueous carrier. Accordingly, the inability to easily absorb and retain water is a serious drawback necessitating complicated and expensive treating methods to achieve the desired flame retardancy, which methods can adversely affect the physical properties of the fiber. Also, because of this same characteristic, fabrics prepared from the continuous themoplastic polymer webs do not acquire an appreciable moisture content from the atmosphere, and this detracts from a natural fabric feel as well as presenting potential static problems.

Copending Robinson application Ser. No. 15,033 entitled "Laminates of Tissue and Random Laid Continuous Filament Web," filed on Feb. 27, 1970, which application has been abandoned in favor of continuation-in-part application Ser. No. 240,754, filed on Apr. 3, 1972, illustrates useful structures of continuous filament webs having a good hand appearance, and also possessing good fluid absorbency and retention. In addition, the structures exhibit substantially isotropic stress and strain characteristics. The structures therein disclosed comprise a laminate of a lightweight cellulosic web and a light-weight web comprised of a plurality of substantially continuous and randomly deposited filaments of a thermoplastic polymer. The laminate is prepared by bonding the continuous filament web to the cellulosic web by means of a spaced pattern of adhesive. Preferred structures illustrated in Robinson comprise outer plies of cellulosic webs and a single inner ply of the continuous filament web.

In addition to the above-discussed properties of a useful structure, a further desirable property is energy absorption which indicates the capacity of a material to deform without functional failure under strain. In uses such as clothing and linens a material is constantly subjected to strains at particular areas such as the elbow and knee areas in wearing apparel and the toe area in bed sheets. To be useful the materials must exhibit some "give" in these areas so as to accommodate the applied strain. On the other hand, they must not "give" so much as to provide substantially no resistance to the applied strain. In other words, to be functionally useful, the material must be capable of carrying or supporting an applied strain over a required distance of deformation. Energy absorption indicates such capacity.

Many disposable materials are non-elastic and thus the above-discussed deformation or elongation is ordinarily permanent. However, since the materials are intended only for limited use, deformation short of complete failure such as accompanies puncturing or noticeable tearing is frequently acceptable. Copending Beaudoin et al. application Ser. No. 126,530, filed Mar 22, 1971 entitled "High Energy Absorbing Continuous Filament Web Laminate," which application has been abandoned in favor of continuation-in-part application Ser. No. 228,349, filed on Feb. 22, 1972, describes the preparation of materials with an especially high capacity for absorbing energy. Materials illustrated therein include laminates of an intermittently, autogeneously bonded continuous filament web and a web of cellulose wadding with ply attachment being achieved with a disruptable polymeric material. The desirable energy absorbing characteristics are achieved by controlling the bonding intensity of both the autogenous bonds and the adhesive bonds in a manner such that on straining the autogenous bonds fail first followed by disruption of the polymeric adhesive.

Laminates containing cellulose wadding such as described in the Beaudoin et al. application are useful where significant material elongation can be tolerated. However, in some applications, material elongation must be restricted. For example, with respect to a material application such as a simple disposable laboratory jacket the degree of acceptable non-elastic elongation can be quite high so long as visible tears or punctures in the wadding are not present. On the other hand, if the jacket is of a specialty type wherein highly fluid repellent characteristics are required, the acceptable degree of elongation accompanying deformation under strain cannot generally exceed the extensibility of the wadding ply since, as the integrity of the wadding begins to deteriorate, the fluid repellent characteristics diminish.

OBJECTS OF THE INVENTION

Accordingly, the principal object of the present invention resides in providing lightweight laminates including a continuous filament web and a cellulosic web which have a desirable capacity for absorbing energy over only a slight amount of laminate elongation.

Another object is to provide a strong nonwoven laminate which can possess in combination with the above stated energy absorbing characteristics, a desirable hand, a pleasing appearance, and good fluid absorbency and retention.

Other objects and advantages of the present invention will become apparent by reference to the following description and the accompanying drawings in which:

FIG. 1 is a schematic illustration of apparatus, and showing one means for forming the nonwoven materials of the present invention;

FIG. 2 is a schematic, cross-sectional view of a laminate in various stages of preparation and showing levels of adhesive penetration therein; and FIG. 3 is a fragmentary plan view of the laminate prepared as illustrated by FIG. 1, and with sections of individual layers broken away.

SUMMARY OF THE INVENTION

Briefly stated, the products hereinafter illustrated comprise laminates of an intermittently and autogenously bonded web of substantially continuous and randomly deposited filaments of a thermoplastic polymer and a cellulosic web which is capable of being strained over a limited extensibility before deteriorating. The intensity of the autogenous bonds in the continuous filament web and the manner of ply attachment are designed so as to provide for the development of increasing stress in the web and the support thereof over moderate laminate elongations and so that the continuous filament web is the principal load bearing member of the laminate over such elongations. The laminates are characterized by a useful capacity for absorbing energy before functional failure of the cellulosic web in combination with desirable properties with respect to hand, drape, appearance, and absorbency.

DESCRIPTION OF PREFERRED EMBODIMENTS

While the present invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

For example, the following illustrative description of the present invention is particularly applicable to the preparation of laminates wherein the cellulosic web is creped cellulosic wadding. The limit of extensibility (i.e., elongation at maximum tensile strength) of such wadding which is employed in fabric-related applications is ordinarily on the order of about 20–40% stretch in the machine direction and generally not greater than about 10% stretch in the cross-machine direction. Products prepared from laminates containing such wadding are generally fabricated so that the machine direction of the wadding constituent is aligned in the direction corresponding to that in which the greatest strain is anticipated.

Moreover, while the machine direction limit of extensibility is ordinarily about 20–40%, the integrity of the wadding, particularly when included in a laminate, frequently begins to noticeably deteriorate, as evidenced by the appearance of holes due to fiber separation, before such limit is reached. Thus, the tolerable limit of extensibility of the cellulosic wadding is generally less than the actual limit of the wadding itself. For example, wadding deterioration which is detrimental in maintaining water repellency can be observed at laminate elongations of as low as 10–15% elongation in laminates containing about 20% stretch wadding and at about 30–35% elongation in laminates containing about 40% stretch wadding.

The technique of laminate preparation illustrated herein is directly applicable to achieving a functionally useful level of energy absorption over limited machine direction elongations short of those tolerable limits mentioned above at which creped wadding deterioration becomes a problem. The applicability of the described techniques to other lightweight, weak cellulosic webs such as unbonded or only lightly bonded cotton or rayon webs as well as to webs with greater or smaller tolerable extensibilities that those specified above will be apparent from the following description.

(a) Preparation of continuous filament web-laydown

Turning now to the drawings, FIG. 1 schematically illustrates apparatus which can be used in preparing laminates of the present invention. As shown, a web 10 comprised of a plurality of substantially continuous and randomly deposited molecularly oriented filaments of a synthetic polymer is unwound from a roll 12 and passed to an adhesive printing station 14. The manner of initial formation of the web 10 is not particularly important, and a variety of well known techniques can be used. In general, such techniques involve continuously extruding a polymer through a spinneret, drawing the spun filaments, and thereafter depositing the drawn filaments on a continuously moving surface in a substantially random fashion. Drawing serves to give the polymer filaments tenacity, while substantially random deposition gives the web desirable isotropic strength characteristics. The aforementioned Kinney patents as well as other patents illustrate useful techniques of initial web formation.

A particularly useful technique is described in copending application Ser. No. 865,128, entitled "Continuous Filament Nonwoven Web and Process for Producing the Same," and filed on October 9, 1969, now U.S. Pat. No. 3,692,618. Use of the method there disclosed permits high rates of web formation. In general, the disclosed method involves conventional spinning of continuous filaments of a synthetic polymer by, for example, extruding the polymer through a multiple number of downwardly directed spinning nozzles preferably extending in a row or multiple number of rows. The filaments as they are spun are gathered into a straight row of side-by-side evenly spaced apart, untwisted bundles each containing at least 15 and preferably from 50 to up to 1000 filaments. These filament bundles are simultaneously drawn downwardly at a velocity of at least 3,000 meters per minute, and preferably from 3,500 to 8,000 meters per minute, in individually surrounding gas columns flowing at a supersonic velocity and thus directed to impinge on a substantially horizontal carrier.

The gathering of the filaments into the bundles and their drawing and directing to impinge on the carrier is preferably effected by passing the bundles through air guns which surround the filaments with a column or jet of air which is directed downward at supersonic velocity. The air guns are arranged so as to extend in one or more rows across the carrier at right angles to its direction of movement, so that the bundles contained in the gas columns as they strike the moving carrier extend in a line or row at right angles across the carrier. In order to enhance intermingling of the bundles, they can be made to oscillate, the plane of oscillation being transverse to the direction of carrier movement. The carrier can be a conventional carrier used in the nonwoven art, such as an endless carrier or belt screen or the upper portion of a drum, as for example a screened drum.

When prepared as described above, the filament bundles containing a number of parallel filaments are laid down on the carrier in a loop-like arrangement with primary loops extending back and forth across the width of a section defined by the impingement of the air column from one air gun on the carrier. Before and as the parallel filament bundles impinge the carrier, they are broken up into sub-bundles containing a lesser number of parallel filaments and forming secondary smaller loops and swirls. The secondary loops and swirls overlap each other, and those of adjacent sections, to result in substantially complete intermingling with the overlapping portions of adjacent sections. Thus, the laid-down filament bundles form a continuous uniform nonwoven web.

Referring again to FIG. 1, the thermoplastic polymer used in preparing the continuous filament web 10 is preferably polypropylene. However, the invention is applicable to webs containing continuous filaments of other spinnable thermoplastic polymers which have sufficiently sharp crystalline melting points to permit their bonding in the manner hereinafter described. Sharp crystalline melting points are helpful in establishing an appropriate level of bond intensity which in turn is important in preparing webs which can be used in fashioning laminates with desirable energy absorbing characteristics. In addition to polypropylene, other useful polymers include polyethylene, polyamides, and esters such as polyethylene terephthalate as well as mixtures of thermoplastic polymers and copolymers. While the various conditions of temperature and pressure illustrated herein to effect bonding are particularly suitable for polypropylene webs, it is felt that the appropriate conditions for effecting bonding of webs of other polymers in order to obtain the desirable attributes discussed herein will be readily apparent to those skilled in the art.

For use in preparing light weight laminates in the manner illustrated in FIG. 1, the web 10 generally can have a basis weight of about 0.3–1 oz./yd.$^2$ with the filaments thereof having a denier of about 0.5–6. Fabrics with an especially suitable combination of strength and aesthetic characteristics can be prepared with webs having basis weight of 0.3–0.7 oz./yd.$^2$ and filament deniers of about 0.8–2.5.

(b) Preparation of continuous filament web-bonding

As contrasted with the method of initial web formation, the manner in which the web is bonded, prior to lamination, is quite important. In this respect, useful webs are those which contain an intermittant pattern of discrete compacted areas formed of autogeneous filament bonds distributed substantially uniformly throughout the web and extending through a major portion thereto. Laminates prepared with webs wherein the total compacted bond area is about 5–50% of the web area and wherein the density of individual compacted areas is about 50–3200 per square inch possess a desirable combination of "hand," drape, and strength. Higher compacted area densities are employed with higher total bonded areas. Particularly preferred laminates with respect to the above-stated combination of properties are those containing webs having a total compacted bond area of about 10–25% and a compacted area density of about 100–500 per square inch.

The use of bonded webs facilitates the laminating procedure illustrated herein since adhesive can be directly printed on the web, thus, for example, allowing the formation of a three-ply laminate with only a single adhesive printing step. Additionally, the use of intermittently bonded webs, wherein substantial open area exists between compacted areas thereby permitting significant adhesive flow-through between compacted regions, results in good delamination resistance with only relatively small quantities of adhesive. Moreover, as hereinafter discussed in greater detail, the nature of the bonds in the compacted areas and particularly their intensity is also quite important in achieving the desirable energy absorbing properties characteristics of the laminates of the present invention.

As previously stated, an important feature of the present invention resides in providing a light weight, continuous filament web—cellulosic web laminate which exhibits a desirable capacity for absorbing energy over only slight laminate elongations. In other words, over small elongations the laminate should provide resistance to deformation caused by an applied strain while at the same time exhibiting a degree of "give" in order to accommodate the strain. If sufficient resistance to deformation is not present, the laminate will rapidly elongate beyond the desired limit under only moderate applications of force. As discussed previously, for applications where only limited extension of the cellulosic web can be tolerated this can be undesirable. On the other hand, if the laminate exhibits substantially no "give" under an applied force, its usefulness for fabric related application is severely limited from a comfort viewpoint.

It has been found that laminates having the above-described desirable combination of resistance and limited "give" can be prepared by employing a continuous filament web which is autogeneously intermittently bonded as previously described and which in addition exhibits a distinctive tensile stress-strain behavior in the directon of anticipated laminate loading. The distinctive behavior is characterized by (1) a maximum web tensile strength substantially greater than that of the cellulosic layer, (2) the absence of any substantial reduction in developed stress in the web over a strain up to that corresponding to the tolerable limit of extensibility of the cellulosic layer, and (3) a web toughness index of greater than about 130 and preferably greater than about 200.

It is presently believed that the combination of these three web characteristics is important for the following reasons: Having a web tensile strength substantially greater than the tensile strength of the cellulosic layer and the fact developed stress does not substantially diminish up to the cellulosic layers limit of extensibility assures, in combination with applicable adhesive print patterns as hereinafter discussed, that the web will be the principal load bearing laminate member over the desired limited deformation. The third characteristic concerning the toughness index is believed to be important in assuring that the laminate will exhibit a desirable resistance to strain and not rapidly elongate beyond the cellulosic layer's limit of extensibility on the application of only a slight force. Such is instrumental in achieving a desirable level of energy absorption prior to deterioration of the cellulosic layer.

The toughness index is the product of the web's elongation (percent) at maximum tensile strength and the maximum tensile strength (lbs./inch) which is normalized for basis weight by dividing this product by the web basis weight (oz./yd.$^2$). The toughness index is believed to be a reliable indication of energy absorption for the webs illustrated herein which have basis weights of less than about 1 oz./yd.$^2$ and generally less than 0.7 oz./yd.$^2$. Also, the indicated desirable values of toughness index given above are thought to be particularly applicable to continuous filament polypropylene webs having filament tenacities of above about 4 grams/denier. The presence of the above-identified stress-strain characteristics for a given autogenously bonded web and cellulosic layer can be readily determined from stress-strain curves.

In order to obtain the above-discussed web stress-strain characteristics and particularly the second and third, the manner in which the web is bonded is important both with respect to the bonding configuration and the bond intensity. The first characteristic is principally related to the strength of the web filaments and is almost always satisfied when the web filaments are molecularly oriented such as by drawing and the cellulosic layer is a conventional weakly bonded creped wadding.

Regarding bond configuration it has been previously stated that webs containing an intermittent pattern of compacted areas of filament bonds are desirable in fashioning laminates with good delamination resistance and pleasing aesthetic characteristics. The bonding configuration also influences the webs stress-strain characteristics, and webs with the configuration previously identified and particularly that specified as being preferred are believed to be especially useful in preparing laminates having the desirable characteristics identified herein. With such configurations, involvement of the compacted areas in a load bearing capacity rapidly occurs on laminate straining and it is principally through such involvement of compacted areas in the straining process that the desirable energy absorbing characteristics exhibited by the present laminates are achieved. In particular, as will now be discussed, the bond intensity, i.e., the strength of the bond between filaments within an individual compacted area, is very important in fashioning a web for laminate preparation which satisfies the second and third of the above-identified stress-strain characteristics.

The continuous filament webs useful in preparing the present laminates are characterized by a bond intensity approaching but less than the breaking strength of the filaments making up the web such that under strain the web filaments can pull free from one another in the compacted areas before fracturing. Thus the bond intensity should approach the tenacity of the web filaments. Such webs are termed "release bonded webs" and they themselves exhibit a surprisingly high capacity for absorbing energy. The statement that a fiber filament is released from an area means that the filament separates from an individual compacted area either alone or combined with other filaments with its identity as an individual fiber filament being preserved. While a released fiber can be distorted, e.g., flattened out over that portion where originally held within the area, it cannot be fractured and still be designated as such.

Webs with releasable bonds have the ability to support loads over strain induced elongations without substantial reductions in the web stress developed by the applied strain. Thus, such webs are believed to satisfy the second of the above-identified stress-strain characteristics. The third web characteristic can be achieved by accomplishing bonding with an intensity such that the bond strength between filaments in compacted areas closely approaches the filament breaking strength.

The theoretical explanation behind such behavior of release bonded webs is that when the web is under strain the filaments in the web will pull free from individual compacted areas when the load on the filament in the vicinity of the compacted area achieves a magnitude of just below the filament's tenacity. Up to this point, the filament carries the applied strain with accompanying stress development in the web. However, as additional strain is applied to the filament, the filament releases from the compacted area, i.e., pulls free, rather than fracturing and, due to the curvilinear configuration of the filament in the web between the discrete compacted areas, the stress developed in the filament is temporarily relieved and the filament is thereafter available to carry additional load when it is once again strained on further elongation of the web.

The releasable bond behavior, while probably applicable to filamentary nonwovens in general, is particularly desirable in continuous filament webs where substantially no fiber ends exist. By releasing under strain, a given continuous filament still continues to be a functional load bearing member of the web even after the web has exhibited substantial elongation and the filament has been repeatedly released from a large number of areas where originally bonded. Moreover, the fact that the filaments in such webs are substantially randomly arranged contributes to the observed continuous load bearing capacity of the web. Due to such random arrangement, an applied strain does not develop a uniform stress in all web filaments. Thus, as stress on a particular web filament is relieved by release from a compacted area, stress is still developing in other filaments (which can include previously released filaments) and the overall stress developed in the web either increases or remains substantially the same until all filaments are released.

In contrast to the above-discussed behavior, if a filament does not release under strain at a developed stress approaching its breaking strength, filament breakage occurs when the stress developed in the filament exceeds its tenacity thus reducing the effective length over which the filament can carry an applied strain. While webs containing such "over-bonded" filaments can exhibit tensile strengths satisfying the first stress-strain characteristics set forth above, due to the decreased effective filament length as a result of breakage, the web will frequently exhibit a reduction in developed stress at very small strains. When such occurs at an elongation less than the tolerable limit of extensibility of the cellulosic layer, the laminate will have generally unacceptable energy absorption for the purposes of the present invention.

Also, over-bonding can result in filament degradation with an accompanying reduction in filament tenacity whereby the filament is weakened or broken thus reducing its load bearing capacity. In over-bonded webs, such filament degradation is particularly evident around the bond edges where the filaments enter the bond areas.

"Under-bonded" webs i.e., webs wherein filaments pull free from compacted areas before a stress sufficiently close to their breaking strength has been developed are also not satsifactory for use herein since they do not usually satisfy the third stress-strain characteristic. In general, such webs rapidly elongate with only small web stress being developed. As a consequence, only a small amount of energy is absorbed when laminates containing such webs are subject to limited strain.

The fact that the compacted areas of the web containing the releasable bonds are distributed in a pattern which is preferably regular over the web is also believed to contribute to desirable energy absorbing and strength characteristics of the web, particularly when a pattern within that previously identified as being preferred is employed (100-500 bond density and 10-25% bond area). A patter of compacted areas in combination with the fact that the filaments are substantially randomly deposited provides for significant unbonded filament spans of generally curvilinear filament lengths between the compacted areas which can align in the direction of strain. The patterned configuration and accompanying alignment serves to enhance the distribution of strain and promote the simultaneous equalization thereof over a large number of filaments such as results from pattern bonding is believed to Since the load bearing capacity of the web depends in part on the number of filaments in the web which are effectively involved in the straining process, the distribution of an applied strain over a greater number of filaments such as results from pattern bonding is believed to be important in combination with the previously discussed bond intensity in achieving webs possessing desirable energy absorbing characteristics for use in the illustrated laminates.

One manner of preparing release bonded webs is described in copending Hansen et al. application Ser. No. 177,077, filed on even date herewith which is a continuation-in-part of now abandoned applications Ser. Nos. 15,534 and 121,880, filed on Feb. 27, 1970 and Mar. 8, 1971, respectively. As therein disclosed, release bonded webs can be prepared by passing the unbonded continuous filament web through the nip formed between a smooth surfaced hard roll and a heated engraved roll containing a plurality of raised points so as to yield a web having a configuration of compacted areas corresponding to that previously identified. The bonding conditions (i.e., the roll temperatures, the nip pressure, the amount of web pre-heating, and the web speed through the nip) are appropriately controlled so as to produce webs having the above described releasable bond character. The roll temperatures and nip pressure are the most important conditions in achieving appropriate bonding.

Release bonded webs prepared from polypropylene filaments suited for use in fashioning the laminates of the present invention can be prepared under the following bonding conditions at web speeds of about 275-350 ft./min. Smooth surfaced hard roll temperature of about 180° F.-325° F., particularly 240° F.-320° F.; engraved roll temperature of about 275° F.-340° F., particularly 300° F.-330° F.; nip pressure (on raised points of engraved roll) of about 3,000-50,000 p.s.i., preferably 20,000-45,000 p.s.i. A degree of web pre-wrap on the smooth surfaced hard roll of about 3-9 inches is also desirably employed.

Table I illustrates certain stress-strain characteristics of a continuous filament polypropylene web bonded under various bonding conditions. The polypropylene web was prepared in accordance with the procedure set forth in the above-mentioned Ser. No. 865,128, now U.S. Pat. No. 3,692,618. The web, prior to bonding, had the following characteristics:

Basis weight (web average) = 0.5 oz./yd.$^2$
Width = 10 inches
Filament denier = 1.62
Filament tenacity = 4.4 grams/denier
Elongation = 142%
Crystalline melting point of polymer = 162° C.

Web bonding was accomplished in the manner described in the aforementioned Hansen et al. application with the bonding nip being comprised of a smooth stainless steel 6" diameter roll with means for being heated and a steel engraved roll also containing means for being heated and having a patterned configuration of raised points on its surface. The raised points on the engraved roll were about 0.04" high and positioned such that the bonded web contained regularly spaced compacted areas in a diamond pattern in a density of about 200/in.$^2$. Each area was a square of about 0.0285" on a side with a diagonal of the square positioned in the machine direction. About 17.5% of the surface area of the web was occupied by the compacted areas. Bonding was accomplished at a speed of 328 ft./min. For all bonded web samples except 1A and 5A, 9 inches of web prewrap on the smooth roll surface were present prior to the bonding nip and 8 inches after the nip. For samples 1A and 5A only 3 inches of web wrap on the smooth roll surface were present prior to the bonding nip.

TABLE 1

| Sample | Roll temperature, ° F. Smooth | Roll temperature, ° F. Engraved | Nip pressure (p.s.i.) | EL[1] C.D. | EL[1] M.D. | ES[2] C.D. | ES[2] M.D. | TS[3] C.D. | TS[3] M.D. | Hand[4] C.D. | Hand[4] M.D. | Toughness index C.D. | Toughness index M.D. |
|---|---|---|---|---|---|---|---|---|---|---|---|---|---|
| 1 | 180 | 300 | 5,500 | 45 | 36 | 25.6 | 25.6 | 2.1 | 2.5 | 4 | 4.5 | 190 | 180 |
| 1A | 180 | 300 | 5,500 | 44 | 33 | 20.4 | 14.9 | 1.6 | 1.6 | | | 140 | 106 |
| 2 | 240 | 300 | 5,500 | 34 | 31 | 18.1 | 26.6 | 2.1 | 3.2 | | | 142 | 198 |
| 3 | 180 | 320 | 5,500 | 41 | 35 | 23.6 | 34.5 | 2.4 | 3.8 | | | 196 | 266 |
| 4 | 240 | 320 | 5,500 | 33 | 31 | 15.7 | 36.8 | 2.0 | 4.4 | 3 | 6 | 132 | 272 |
| 5 | 180 | 300 | 28,000 | 50 | 42 | 38.3 | 46.6 | 3.2 | 4.5 | 3 | 4 | 320 | 378 |
| 5A | 180 | 300 | 28,000 | 50 | 43 | 34.2 | 51.2 | 2.2 | 4.6 | | | 220 | 396 |
| 6 | 240 | 300 | 28,000 | 41 | 40 | 26.7 | 55.4 | 2.7 | 5.5 | | | 216 | 440 |
| 7 | 180 | 320 | 28,000 | 43 | 34 | 26.1 | 32.4 | 2.5 | 3.9 | | | 216 | 266 |
| 8 | 240 | 320 | 28,000 | 28 | 22 | 14.2 | 16.4 | 2.1 | 2.9 | 5 | 7 | 118 | 128 |

[1] Percent elongation to peak tensile.
[2] Can be obtained with a conventional Instron tensile testing machine equipped with an automatic integrator and as described in the Instron Manual Procedure #10-1-1c. As set forth therein, energy absorption to peak tensile is related to the integrator read out according to the following formula (Measurement being made on 8" by 8" samples folded so as to have four plies, 2" wide and 8" long with a 5" jaw span. All values referred to herein being based on such a sample size.) ES = (I)/(5000) x L x S: ES = Energy absorption (in.-lbs./40 in.$^2$): I = Integrator read out: L = Full scale load (lbs.): S = Cross head speed (in./min.) —20 inches/min. for examples.
[3] Tensile strength was measured on a 8 by 8 inch sample folded as above-described using a 5" jaw span and an Instron machine with a cross-head speed of 20 inches/minute. Values are reported in lbs./inch. (maximum tensile divided by 8).
[4] Indicates web stiffness. Reported value is the force (in grams) required to bend sample using a standard Thwing-Albert Instrument Company Handle-o-Meter.

Referring to Table I, it can be observed that the stress-strain characteristics are influenced by the bonding conditions employed. In particular, it can be seen that the sample 1A web does not have a machine direction toughness index which would render it suitable in preparing laminates with conventional creped wadding having the aforementioned desirable energy absorbing capacity at tolerable elongations when the machine direction of the web and wadding are parallel. However, an acceptable laminate can be prepared with the sample 1A web by cross-laying the laminate plies.

On the other hand, the remaining samples would appear to have an acceptable toughness index in both machine and cross directions with the possible exception of the sample 8 web. However, in fact, laminates prepared from the sample 8 web are not particularly desirable and such is believed to be principally due to the fact that this web is "over-bonded." This web does not satisfy the second of the previously mentioned stress-strain characteristics concerning the ability to carry an applied stress over a limited elongation without any substantial reduction therein. It should be noted that the elongation to peak tensile of the sample 8 web is quite low as is the energy absorption of the web itself.

As should be apparent, the selection of an appropriate web can be based on the stress-strain characteristics which the web exhibits. Thus, the toughness index as previously defined can be principally used to establish web under-bondedness. Over-bondedness is principaly indicated by a noticeable falling off of the stress-strain curve at an elongation which is less than the tolerable extensibility of the laminate and frequently also by a poor toughness index. Additionally, an appropriately bonded web exhibits an audible crackling or pinging sound attributable to filament release from the compacted areas on straining and the progressive disappearance of compacted areas due to filament release therefrom during web strain can be visually observed.

In addition to directly observing the stress-strain curve, it is also believed that web over-bondedness for the purposes described herein is evidenced by the web's trapezoidal tear characteristics. In particular, it has been noted that "over-bonded" webs are characterized by being similar in tear to a perforated piece of paper and exhibit reduced trapezoidal tear characteristic both with respect to maximum tear load and tear energy.

Table II illustrates the trapezoidal tear strength characteristics of the sample 1A, 5, 5A and 8 webs. Tear strength was measured in accordance with the procedure described in ASTM D-2263 with the initial cut being made in the cross-machine direction of the web. As shown, maximum tear load and, with respect to samples 5 and 5A, tear energy go up as bonding becomes more intense. However, as illustrated by the tear behavior of the sample 8 web, over-bonding results in a significant decrease in tear load and energy. Webs wherein the bonding intensity is optimum in so far as avoiding "over-bondedness" exhibit tear characteristics within about 50%, and preferably about 25%, of the maximum obtainable tear characteristics for that web. The trapezoidal tear test is straight forward and believed to be sensitive to web overbonding.

Values of the specific tear strength and tear energy are also presented in Table II. These specific tear values are obtained by dividing the absolute values by the web basis weight (gms./m.²) and thus represent basis weight normalized tear characteristics. Thus, the specific tear values are independent of web basis weight and should, accordingly, be principally dependent only on the tenacity of the web filaments and the intensity of the bonding conditions. Referring to the specific tear energies reported in Table II, it can be seen that webs having a basis weight of about 0.5 oz./yd.² prepared as illustrated herein from polypropylene filaments having a tenacity of about 4.4 grams/denier are characterized by a specific trapezoidal tear energy of about about 7.8 whereas the "over-bonded" web of sample 8 has a markedly reduced specific tear energy of only about 2.8. Moreover, being normalized for basis weight, it is believed that so long as filaments with similar tenacities are employed the specific tear values observed for these webs will also be characteristic of webs with higher or lower basis weights. Such as believed to be particularly true with respect to low basis weight webs, e.g., those having a basis weight of less than about 1 oz./yd.², where web bonding can be easily accomplished to achieve an appropriate filament bonding intensity substantially through the thickness of the web in the compacted areas.

The effect of filament tenacity on specific tear characteristics is direct with higher specific characteristics being associated with webs similarly bonded containing higher tenacity filaments. In general, bonded webs useful in preparing laminates in accordance with the present invention with filaments having a tenacity of about 2–7 grams/denier will satisfy the above-described toughness index characteristics, and will have specific trapezoidal tear energy values of about $5 \times 10^6$–$15 \times 10^6$ cm.³ with higher specific tear energies being associated with webs containing higher tenacity filaments.

TABLE II.—TRAPEZOIDAL TEAR CHARACTERISTICS [1]

| Sample | Maximum load (g.) | Energy to failure (cm.-kg.) | Specific load ($10^6$ cm.²) | Specific energy ($10^6$ cm.³) |
|---|---|---|---|---|
| 1A | 1,550 | 14.5 | .91 | 8.55 |
| 5 | 2,450 | 13.1 | 1.52 | 8.70 |
| 5A | 2,290 | 11.7 | 1.63 | 7.81 |
| 8 | 1,160 | 4.22 | 0.78 | 2.81 |

[1] For tear characteristics, samples had following basis weights: Ex. 1A–17 g./m.²; Ex. 5, 5A, and 8–15 g./m.².

(c) Preparation of laminate

Referring again to FIG. 1, at the printing station 14 the intermittently bonded continuous filament web 10 having the aforementioned desirable stress-strain characteristics is printed on the bottom surface with a discontinuous adhesive pattern. Thus, as is shown, the web passes between an adhesive printing roll 16 and back-up roll 18, the printing roll 16 being partially submerged in the tank 20 containing adhesive 22. The surface of the printing roll 16 is provided with a series of grooves which serve to pick up the adhesive 22 from the tank 20 and transfer the adhesive to the bottom surface of the web 10. A doctor blade can be used to control the amount of adhesive applied.

The grooves on the roll 16 can be any patterned configuration; however, it is important that the pattern be substantially open and that, after printing, the area of the web which is occupied by adhesive be not more than about 25% of the total area, and preferably only about 15% or less of the area. Having an open adhesive pattern is desirable in achieving a soft, drapable laminate. In addition, in order to realize the advantages associated with the present invention and in particular with respect to that aspect which concerns assuring that the continuous filament web is the principal load bearing member over limited elongation, it is important that patterned areas of adhesive be spaced apart in the direction of intended elongation so as not to substantially interfere with filament release from a predominant number of compacted areas over small laminate elongations. On an average, at least about 2, and preferably at least about 3, compacted continuous filament web areas should be disposed between adjacent adhesive areas.

It has been found that it is desirable to employ a staggered brick shaped adhesive print pattern as illustrated in FIG. 3. In addition a space pattern of adhesive line segments which simulates a plain weave with the warp threads in the machine direction or with the warp and fill weave directions at about 45° to the normal web machine direction can be used. A further pattern is a slant brick with the bricks at about 70° to the machine direction. About 0.15–0.75 oz./yd.² of adhesive, and preferably 0.2–0.6 oz./yd.² of adhesive can be employed.

While other types of adhesives such as hot melts and latexes can be employed in the process described herein, it is preferred to employ a plastisol adhesive because of the ease of application and the ability to cure without adversely affecting the desirable laminate characteristics. For example, a plastisol comprised of a polyvinyl chloride resin plasticized with dioctyl phthalate or any other well known plasticizer can advantageously be used so long as curing can be accomplished at a temperature which does not adversely affect the components of the laminate. At application, the viscosity of the plastisol is generally about 800–6,000 cps. and, preferably 1200–3200 cps., in order to obtain satisfactory transfer to the web.

Following the adhesive addition, the cellulosic webs 24 and 26, generally, having basis weights of 0.3–0.7 oz./yd.$^2$ and unwound from rolls 28 and 30, are brought into contact with the adhesively printed web 10 at the roll 32 to form the laminate 34. After formation, the laminate is passed around the heated drum 36 order to cure the plastisol. The roll 32 and the take off roll 38 serve to maintain contact between the laminate 34 and the heated drum 36. If only a two ply laminate is desired, only the bottom cellulosic web 24 is employed.

In order to obtain a laminate which is both aesthetically pleasing and possesses high delamination resistance, the manner in which the laminate is formed is important. Thus, in accordance with one embodiment, laminate formation is accomplished such that the adhesive used in bonding sufficiently penetrates the cellulosic layers to assure good laminate strength, and yet adhesive strike-through to the outer surfaces of the cellulose and adhesive spreading within the laminate is minimized. Adhesive strike-through adversely affects laminate appearance, while adhesive spreading gives rise to an undesirable increase in laminate stiffness and can interfere with the aforementioned releasable bond behavior.

With reference to FIG. 1, suitable laminate bonding with a plastisol adhesive can be accomplished by appropriately coordinating the temperature of the heated drum, the time during which the laminate is in contact with the drum (dwell time), and the pressure exerted on the laminate in the nip formed between the drum and the roll 32. In understanding the manner in which these parameters are coordinated, reference is directed to FIG. 2. Embodiment (a) shows the plastisol adhesive 22 on the bottom surface of the web 10 prior to the time at which the web 10 is united with the cellulosic layers at the roll 32. The viscosity of the adhesive at this time is about the same as its application viscosity and thus is low. Consequently, on bringing the web into contact with the cellulosic webs and subsequently bringing the laminate into contact with the drum, care must be exercised to avoid excessive adhesive penetration and spreading. Nip pressures between the roll 32 and the drum on the order of about 70–100 p.l.i. are sufficient to achieve a desirable penetration as illustrated in embodiment (b) of FIG. 2.

On the other hand, as the laminate travels on the drum surface, plastisol temperature and viscosity rise, and the problem of excessive adhesive penetration becomes less significant. Regarding travel on the drum surface, the laminate must remain in contact with the surface for a sufficient time to permit the plastisol to cure and develop maximum strength characteristics. For drum temperatures of 250° F.–300° F., dwell times of .5–3 seconds are usually sufficient. Embodiment (c) of FIG. 2 depicts a cross section of the finished laminate with the plastisol substantially cured. As can be seen, little additional adhesive penetration occurs during curing on the drum surface.

Referring again to FIG. 1, after leaving the drum 36, the laminate can be passed through the calender stack 40 to provide a smooth surface finish and then wound up on the roll 42. Typically the calender stack 40 comprises three rolls, 44, 46, and 48, with the top roll 44 generally being at about the same temperature as the drum 36 in order to assure complete plastisol curing. Pressures about equivalent to the nip pressure between the roll 32 and the drum are useful calender pressures.

FIG. 3 illustrates a laminate prepared by the method described above. As shown, the laminate has outer plies of cellulosic webs 24 and 26 and a single inner ply of a continuous filament web 10. The individual filaments in web 10 are autogenously bonded together in the intermittent pattern of compacted areas 50. The layers 24, 10 and 26 are united together by means of the spaced pattern of plastisol adhesive 22.

The laminate illustrated in FIG. 3 is characterized by good aesthetic properties with respect to appearance and feel and readily absorbs and retains fluids. In addition the laminate possesses a desirable capacity for absorbing energy over limited strain.

In keeping with the present invention, laminates can be prepared having outer layers of bonded continuous filament webs and a single layer of a cellulosic web. Such laminates can be easily prepared by the method illustrated with respect to FIG. 1 by employing two continuous filament webs, 24 and 26, and a single cellulosic web 10. In other respects the process described with respect to FIG. 1 can remain the same. As disclosed in copending Brock and Hudson application Ser. No. 14,930, entitled "Laminates Containing Outer Plies of Continuous Filament Webs," filed on Feb. 27, 1970 and now abandoned in favor of continuation-in-part application Ser. No. 247,962, filed Apr. 27, 1972, laminates wherein the outer layers are continuous filament webs possess many desirable characteristics, such as an enhanced textile-like quality, wrinkle resistance, and the ability to be washed several times, in addition to the properties discussed above with respect to the Robinson application. When such laminates are prepared with intermittent bonded continuous filament webs such as described herein, the laminates also possess a high level of energy absorption over small elongations which, as previously discussed, is very desirable.

The following examples illustrate the invention. All parts and percentages are by weight unless otherwise indicated. As reported in the examples, energy absorption, ES, is obtained by integrating the area under the stress-strain curve using a conventional Instron tensile testing machine as previously discussed. For these examples, however, measurement is made on unfolded 6" x 1" samples (3 inch jaw span) and energy absorption is reported in inch-lbs. Further with respect to the examples, tensile strength (TS) and elongation (E) are measured on similar samples using a cross-head speed of 12 in./min. according to ASTM D 1117–63. Trapezoidal tear (TT), gram tensile (GT), wrinkle recovery (WR), abrasion resistance (AR), Mullen burst (MB), and opacity (Op) are measured using the following standard procedures:

(TT)=ASTM D 2263–65T
(GT)=ASTM D 1117–63
(WR)=A$^2$TC$^2$ 66–1959T
(AR=STOLL—ASTM D 1175–64T
(MB)=TAPPI 403 ts–63
(Op)=TAPPI T425M–60

EXAMPLE I

A laminate having outer plies of creped cellulose wadding (each being 12" wide, and having a basis weight of 13 g./yd.$^2$ and 30% stretch in machine direction) and an inner ply of an intermittently release bonded continuous filament polypropylene web (12" wide with basis weight of 15 g./yd.$^2$—bonded according to sample 5 of Table I) was prepared in a manner described above with reference to FIG. 1 with parallel wadding and web machine directions. The conditions of preparation were as follows: Web speed=50 ft./min.; roll 32=6.5 inch dia., 200 p.l.i. pressure against drum 36; drum 36=30 inch. dia., 285° F.; rolls 44, 46, and 48=10 inch dia., roll 44 at 225° F., calender pressure at 200 p.l.i.; laminate wrap on drum surface=4.25 ft. The adhesive applied at the printing station 14 was a plastisol consisting of: 100 parts polyvinyl chloride copolymer (Geon 130 x 10), 100 parts dioctyl phthalate plasticizer (BFG 264) and 10 parts low odor mineral spirits (#17). The plastisol was applied to the web in an amount of 5 grams/yd.$^2$ and at a Brookfield viscosity of 1400 cps. (#4 spindle, 20 r.p.m., 30° C.). After printing, the plastisol occupied 10% of the web area and was disposed thereon in a rectangular block (0.02" x 0.20") pattern with 43,200 blocks/yd.$^2$.

The laminate, prepared as above described, was tested with respect to energy absorption and the other properties previously discussed. The results are presented in Table III.

TABLE III

| Test | M.D. | C.D. |
|---|---|---|
| Energy absorption (in.-lbs.) | 3 | 3.9 |
| Tensile strength (lbs.) | 5.9 | 4.9 |
| Elongation (percent) | 24 | 44 |
| Trapezoidal tear (lbs.) | 4.1 | 4.1 |
| Grab tensile (lbs.) | 15.7 | 14.0 |
| Wrinkle recovery (degrees) | 217 | |
| Abrasion resistance (top) (cycles to pill) | 590 | |
| Mullen burst (p.s.i.) | 29 | |
| Opacity (percent light absorption) | 70 | |

EXAMPLE II

Example I was repeated except that the laminate prepared consisted of outer plies of the intermittently release bonded continuous filament web and the inner web was the creped cellulose wadding. The process conditions were substantially the same as for Example I. The laminate of Example II was also tested for energy absorption and the other properties previously discussed. The results are presented in Table IV.

TABLE IV

| Test | M.D. | C.D. |
|---|---|---|
| Energy absorption (in.-lbs.) | 4.9 | 5.2 |
| Tensile strength (lbs.) | 9.5 | 6.5 |
| Elongation (percent) | 27 | 49 |
| Trapezoidal tear (lbs.) | 7.8 | 6.5 |
| Grab tensile (lbs.) | 25.3 | 20.7 |
| Wrinkle recovery (degrees) | 270 | |
| Abrasion resistance (top-cycles to pill) | 713 | |
| Mullen burst (p.s.i.) | 49.6 | |
| Opacity (percent light absorption) | 64 | |

With respect to the illustrated laminates the initiation of wadding deterioration in the machine direction occurs prior to the reported elongations at failure, and generally at about 18–22% laminate elongation. However high values of the energy absorption of these laminates at failure in combination with the fact that such failure occurs at an elongation only slightly above the deterioration elongation indicates that these laminates will have a functionally useful capacity for absorbing energy over a limited elongation coincident with that at which wadding deterioration begins. In addition, Tables III and IV illustrate many other desirable characteristics of laminates prepared in accordance with the present invention.

We claim:

1. A nonwoven, fabric-like material comprising
(A) a light weight cellulosic layer which is capable of being strained in at least one direction over a limited extensibility before noticeable deterioration occurs,
(B) a web comprised of substantially continuous and randomly deposited molecularly oriented filaments of a thermoplastic polymer containing a multiplicity of discrete compacted areas of autogenous filament bonds which extend through a major portion of the thickness of the web, said continuous filament web having a toughness index of at least about 130 and stress-strain characteristics such that no substantial reduction in developed stress occurs over said limited extensibility of the cellulosic layer, and
(C) spaced areas of adhesive bonding said cellulosic layer and said web together in laminar relationship, said adhesive at said spaced areas extending through the continuous filament web between said compacted areas and into said cellulosic layer and spaced apart in the direction of extensibility of said cellulosic layer to permit the continuous filament web to be the principal load bearing member of the material over said limited extensibility such that the material possesses a high capacity for absorbing energy over strain induced elongations of up to said limit of extensibility of the cellulosic layer.

2. The nonwoven, fabric-like material of claim 1 wherein the cellulosic layer is creped cellulosic wadding having 20%–40% stretch in the machine direction.

3. The nonwoven, fabric-like material of claim 2 wherein the thermoplastic polymer is polypropylene and the compacted areas occupy a web area of about 10%–25% and are present in a density of about 100–500/in.$^2$.

4. The nonwoven, fabric-like material of claim 3 wherein the continuous filament web has a basis weight of about 0.3–1 oz./yd.$^2$, the filaments therein have a denier of about 0.5–6 and a tenacity above about 4 grams/denier, and a toughness index of at least about 200.

5. The nonwoven, fabric-like material of claim 4 wherein the area occupied by adhesive is less than 25% and the adhesive is present in an amount of about 0.15–0.75 oz./yd.$^2$.

6. The nonwoven, fabric-like material of claim 5 wherein the continuous filament web has a basis weight of about 0.3–0.7 oz./yd.$^2$ and the filaments therein have a denier of about 0.8–2.5, the creped cellulosic wadding has a basis weight of about 0.3–0.7 oz./yd.$^2$, and the adhesive is present in an amount of about 0.2–0.6 oz./yd.$^2$ and occupies an area of less than about 15%.

7. The nonwoven, fabric-like material of claim 6 containing a ply of said cellulosic wadding disposed on either side of said continuous filament web.

8. The nonwoven, fabric-like material of claim 6 containing a ply of said continuous filament web disposed on either side of said cellulosic wadding.

9. A nonwoven, fabric-like material having a desirable capacity for absorbing energy over limited elongations comprising a light weight cellulosic layer which is capable of being strained in at least one direction over a limited extensibility before noticeable deterioration thereof occurs and, disposed in laminar relationship therewith, a web comprised of substantially continuous and randomly deposited molecularly oriented filaments of a thermoplastic polymer containing a multiplicity of discrete compacted areas of autogenous filament bonds which extend through a major portion of the thickness of the web, ply attachment in said material being at only spaced areas between said web and layer and effected by means of adhesive flow through the continuous filament web between compacted areas thereof into the cellulosic layer, said discrete compacted areas of autogenous filament bonds and spaced adhesive areas being disposed in a pattern permitting the continuous filament web, through involvement of the compacted areas thereof to be the principal load bearing member of the material over elongations coincident with said limited extensibility of the cellulosic layer, said autogenous filament bonds within said compacted areas having an intensity approaching but less than the breaking strength of the filaments such that the bonded filaments pull free from one another before fracturing when the material is subjected to strain over said limited extensibility.

10. The nonwoven, fabric-like material of claim 9 wherein the compacted areas of autogenous filament bands occupy a web area of about 10%–25% and are present in a density of about 100–500/in.$^2$ and the area occupied by said spaced adhesive is less than 25%.

11. The nonwoven, fabric-like material of claim 10 wherein at least two of said compacted areas are present between adjacent areas of adhesive in the direction of maximum extensibility of said cellulosic layer.

12. The nonwoven, fabric-like material of claim 11 wherein the cellulosic layer is creped cellulosic wadding having 20%–40% stretch in the machine direction.

13. The nonwoven, fabric-like material of claim 12 wherein the thermoplastic polymer is polypropylene.

14. The nonwoven, fabric-like material of claim 13 wherein the continuous filament web has a basis weight of about 0.3–1 oz./yd.$^2$, the filaments therein have a denier of about 0.5–6.

15. The nonwoven, fabric-like material of claim 14 wherein the polypropylene filaments have a denier of about 0.8–2.5 and a tenacity above about 4 grams/denier and the continuous filament web has a toughness index of above about 200.

16. The nonwoven, fabric-like material of of claim 8 wherein the polypropylene filaments have a tenacity of about 2–7 grams/denier and the continuous filament web has a specific tear energy of about $5 \times 10^6$–$15 \times 10^6$ cm.$^3$.

17. The nonwoven, fabric-like material of claim 16 wherein the continuous filament web has a toughness index of at least about 200.

References Cited

UNITED STATES PATENTS

| | | | |
|---|---|---|---|
| 3,695,985 | 10/1972 | Brock et al. | 161—148 |
| 2,900,980 | 8/1959 | Harwood | 161—157 |
| 3,484,330 | 12/1969 | Sokolowski et al. | 161—59 |
| 3,368,934 | 2/1968 | Vosburgh | 161—150 |
| 3,459,627 | 8/1969 | Vosburgh | 161—148 |
| 2,902,395 | 9/1959 | Hirschy et al. | 161—57 |
| 3,072,511 | 1/1963 | Harwood | 161—57 |
| 3,025,199 | 3/1962 | Harwood | 161—57 |
| 3,314,841 | 4/1967 | Romanin | 161—143 |

GEORGE F. LESMES, Primary Examiner

J. J. BELL Assistant Examiner

U.S. Cl. X.R.

156—291, 306, 309; 161—150, 156